US005756843A

United States Patent [19]
Webb et al.

[11] Patent Number: 5,756,843
[45] Date of Patent: May 26, 1998

[54] QUATERNARY BISPHENOLATES, METHODS FOR THEIR PREPARATION, AND USES THEREOF

[75] Inventors: Jimmy Lynn Webb, Ballston Lake; Matthew Hal Littlejohn, Green Island; Joseph John Caringi, Niskayuna, all of N.Y.; Thomas Link Guggenheim, Mt. Vernon, Ind.; Robert Joseph Nick, Bergen op Zoom, Netherlands; Patrick Joseph McCloskey, Watervliet; Joseph Anthony King, Jr., Niskayuna, both of N.Y.

[73] Assignee: General Electric Company, Schenectady, N.Y.

[21] Appl. No.: 768,871

[22] Filed: Dec. 17, 1996

Related U.S. Application Data

[60] Provisional application No. 60/021,750, Jul. 15, 1996.

[51] Int. Cl.⁶ .................... C07C 279/00; C07C 211/63; C07F 9/54
[52] U.S. Cl. .................. 564/240; 564/280; 568/9; 568/11

[58] Field of Search ............... 564/280, 236, 564/241, 286, 295, 240; 568/9, 11

[56] References Cited

U.S. PATENT DOCUMENTS

| | | | |
|---|---|---|---|
| 3,284,407 | 11/1966 | Winfield et al. | 564/280 X |
| 4,022,698 | 5/1977 | Jenkner | 564/236 X |
| 4,340,761 | 7/1982 | Doorakian et al. | 568/11 |
| 4,395,574 | 7/1983 | Doorakian et al. | 568/11 |
| 5,152,807 | 10/1992 | Sexton et al. | 44/409 |
| 5,514,813 | 5/1996 | Brunelle | 548/462 |

*Primary Examiner*—Fiona T. Powers
*Attorney, Agent, or Firm*—William H. Pittman; Douglas E. Stoner

[57] ABSTRACT

Quaternary salts having a double helix structure are prepared by the reaction of dihydroxyaromatic compound, preferably a bisphenol, with an alkali metal hydroxide and a quaternary salt, such as a tetraalkylammonium or hexaalkylguanidinium chloride. The quaternary salts and their alkaline hydrolysis products are useful as catalysts in various reactions, including imide formation from bisphenol salts and halo- or nitro-substituted phthalimides and redistribution and equilibration of polycarbonates.

16 Claims, No Drawings

QUATERNARY BISPHENOLATES, METHODS FOR THEIR PREPARATION, AND USES THEREOF

CROSS-REFERENCE TO RELATED APPLICATION

This application claims priority from copending provisional application Ser. No. 60/021,750, filed on Jul. 15, 1996.

BACKGROUND OF THE INVENTION

This invention relates to bisphenol chemistry, and more particularly to the preparation of a genus of catalysts containing bisphenol moieties.

The use of tetraalkylammonium and hexaalkylguanidinium salts as phase transfer catalysts in the preparation of various polymers is known. In particular, U.S. Pat. Nos. 4,273,712 and 5,132,423 disclose the reaction of bisphenol salts with halo- or nitro-substituted phthalimides in an organic medium to produce bisimides which, upon conversion to dianhydrides and reaction with diamines, form polyetherimides. U.S. Pat. Nos. 3,787,364, 3,838,097, 3,847,869 and 5,229,482 disclose a similarly phase transfer catalyzed reaction of bisphenol salts with halo- or nitro-substituted bis(phthalimido) derivatives of aromatic diamines or with similar compounds, resulting in the direct formation of polyetherimides and other polyether polymers. The phase transfer catalysts employed according to U.S. Pat. No. 5,132,423 and 5,229,482 are guanidinium and especially hexaalkylguanidinium salts; in the other patents, tetraalkylammonium salts are disclosed as suitable catalysts.

The hexaalkylguanidinium salts which are easiest to prepare are the chlorides, but they are hygroscopic. It is burdensome to store them in anhydrous form and subsequently dry them or to isolate them in anhydrous form, which is essential for the polyetherimide-forming reactions.

One of the by-products in the reaction of bisphenol salts with nitro-substituted compounds is an alkali metal nitrite, typically sodium nitrite. It is ordinarily removed by washing the organic reaction system with water. It would be desirable to recover the sodium nitrite and sell it for further use.

However, chloride levels in by-product nitrite salts are high, which can cause corrosion of metal reaction vessels in contact therewith. In addition, commercial applicability requires that sodium nitrite contain a very low chloride level, typically no greater than 100 ppm by weight, which is difficult or impossible to attain with the use of a hexaalkylguanidinium chloride, for example, as a phase transfer catalyst.

For these reasons and others, it is desirable to prepare non-hygroscopic hexaalkylguanidinium and tetraalkylammonium salts, as well as salts containing an anion other than chloride.

SUMMARY OF THE INVENTION

The present invention is based on the discovery of a novel series of hydrogen-bonded tetraalkylammonium, tetraalkylphosphonium and hexaalkylguanidinium bisphenolates. These compounds are easily synthesized or may be obtained from waste streams generated in various stages of polyetherimide production. They can be obtained in high yield by certain adjustments in the treatment of the waste stream.

The quaternary bisphenolates have high oxidative and thermal stability and are non-hygroscopic. Therefore, they are easily stored. They are convertible to compounds effective as phase transfer catalysts in the production of polyetherimides and similar polymers. They are also capable of use in other processes involving the recycle of such materials as hexaalkylguanidinium salts and bisphenols. Moreover, they themselves are active as catalysts in the production of other polymers including linear and branched polycarbonates.

In one of its aspects, the invention includes quaternary salts of dihydroxyaromatic compounds, said salts having the molecular formula

$$H_3Q(OA^1O)_2, \qquad (I)$$

wherein $A^1$ is a divalent aromatic radical and Q is a monocationic carbon- and nitrogen- or phosphorus-containing moiety.

Another aspect of the invention is a method for preparing a quaternary salt of the type represented by formula I which comprises contacting a dihydroxyaromatic compound of the formula $(HO)_2A^1$ with an alkali metal hydroxide and a quaternary salt of the formula $Q^+X^-$, wherein $A^1$, Q and Y are as previously defined and X is halide.

Another aspect is a method for preparing a polyether or intermediate therefor which comprises contacting, at a temperature in the range of about 100°–250° C., at least one alkali metal salt of a dihydroxyaromatic compound with at least one halo- or nitro-substituted aromatic compound in the presence of a catalytic amount of an alkaline hydrolysis product of said quaternary salt of the type represented by formula I.

A further aspect is a method of preparing a branched polycarbonate which comprises equilibrating a reaction system comprising a linear or branched polycarbonate of a different molecular weight from the desired one in the presence of a polyphenolic compound and a catalytic amount of said quaternary salt of the type represented by formula I.

Still another aspect is a method of preparing a polycarbonate which comprises contacting at least one dihydroxyaromatic compound with a diaryl carbonate in the melt in the presence of a catalytic amount of said quaternary salt of the type represented by formula I.

DETAILED DESCRIPTION OF THE PREFERRED EMBODIMENTS

The Q radical in the quaternary salts of formula I is a monocationic carbon- and nitrogen- or phosphorus-containing moiety; i.e., a moiety having a single positive charge. It may be a tetraalkylammonium or tetraalkylphosphonium moiety wherein the alkyl groups contain 2–12 and preferably 2–6 carbon atoms, as illustrated by tetraethylammonium, tetra-n-butylammonium, tetra-n-butylphosphonium and diethyidi-n-butylammonium. Preferably, however, it is a hexaalkylguanidinium moiety such as hexaethylguanidinium, hexa-n-butylguanidinium or tetraethyldi-n-butylguanidinium. The atom content of the Q radical is preferably 9–40 atoms including carbon and nitrogen or phosphorus atoms; its size is governed by the fact that the tetraethylammonium and tetraethylphosphonium cations contain 8 carbon atoms and one nitrogen or phosphorus atom for a total of 9, while the hexahexylguanidinium cation contains 37 carbon atoms and 3 nitrogen atoms for a total of 40.

The $A^1$ radical may be a monocyclic radical; i.e., an unsubstituted or substituted m- or p-phenylene radical. Most often, however, it has the formula

$$-A^2-Y-A^2-, \qquad (II)$$

wherein $A^2$ is unsubstituted p-phenylene and Y is a single bond or a bridging radical wherein 1-2 atoms separate the $A^2$ values; i.e., $A^1$ is a bisphenol-derived moiety. The preferred moieties of this type are those in which $A^2$ is p-phenylene and Y may be any bridging radical in which one or two atoms separate the two $A^2$ values. Illustrative Y radicals include methylene, ethylene, isopropylidene, 2,2-dichloroethylidene, oxygen and sulfur. It is also possible for Y to be a single bond, as is the case with 4,4'-biphenol. The preferred Y value is isopropylidene, which is present when the bisphenol employed as described hereinafter is 2,2-bis (4-hydroxyphenyl)propane; i.e., bisphenol A.

By reason of the strong preference herein for compounds in which $A^1$ has formula II, the quaternary salts of this invention are frequently designated "quaternary bisphenolates" hereinafter. It should be understood, however, that quaternary salts wherein $A^1$ is monocyclic may be substituted for quaternary bisphenolates where appropriate.

The quaternary salts of the invention may be prepared by the reaction of a dihydroxyaromatic compound of the formula $(HO)_2A^1$ with an alkali metal hydroxide and a quaternary salt of the formula $Q^+X^-$. The X value in the quaternary salt is halide, preferably bromide or chloride and most preferably chloride. Typical reaction temperatures are in the range of about 10°–125° and preferably about 10°–50° C. An inert atmosphere such as nitrogen or argon may be employed.

In a preferred embodiment of the invention, the reaction takes place in an aqueous medium, most often also containing a $C_{1-3}$ alkanol and preferably methanol. The quaternary bisphenolate is usually insoluble in water but soluble in the alkanol, and often precipitates spontaneously; if not, it can be precipitated by addition of water.

It is generally found convenient to initially form an alcoholic mixture of bisphenol and alkali metal hydroxide, whereupon the bisphenol dissolves as the alkali metal salt, and to add thereto an aqueous-alcoholic solution of the quaternary salt. Another alternative is to combine the bisphenol and quaternary salt and gradually add aqueous alkali metal hydroxide solution thereto. In the water-alkanol embodiment, ambient temperatures in the range of about 20°–30° C. are generally preferred.

In still another procedure, a non-polar organic solvent such as toluene is employed. An aqueous alkaline solution of the quaternary salt is added gradually to a combination of the bisphenol and refluxing solvent. The product precipitates out and can be purified by washing with water. Further purification of product obtained by any of these methods can be achieved by recrystallization, most often from an alkanol and preferably methanol.

Reactant proportions are not critical in the method for preparing the quaternary bisphenolates. This is apparent from the fact that their formation was initially discovered in mixtures comprising the non-stoichiometric proportions of 2 moles of alkali metal hydroxide, 2 moles of hexaalkylguanidinium chloride and 1 mole of bisphenol. For optimum yield, however, a bisphenol:quaternary salt:alkali metal hydroxide molar ratio of 2:1:0.5–1.5 and especially 2:1:1 is preferred.

X-ray diffraction analysis of the product obtained from bisphenol A, hexaethylguanidinium chloride and sodium hydroxide has shown it to have the molecular structure of a double helix of anionic bisphenol A moieties interconnected via hydrogen bonds between two oxygen atoms through the three protons. The hexaethylguanidinium cationic moieties are ionically associated with the anionic double helix and most often are located within the pockets formed by the hydrogen bonds. A similar structure is postulated for other quaternary bisphenolates of the invention.

The preparation of the quaternary bisphenolates of this invention is illustrated by the following examples. All percentages are by weight. "Catalyst solution" in these examples is, unless otherwise indicated, an aqueous solution of 28.54% hexaethylguanidinium chloride and 10.09% sodium chloride.

EXAMPLE 1

A 5-l round-bottomed flask was purged with nitrogen and charged with 228.29 g (1 mole) of bisphenol A, 20.29 g (0.5 mole) of sodium hydroxide and 300 ml of methanol. The resulting solution was magnetically stirred under nitrogen. A blend of 462.26 g of catalyst solution (0.5 mole of hexaethylguanidinium chloride) and about 175 ml of methanol was added rapidly, whereupon a solid immediately precipitated. Methanol, 900 ml, was added with stirring to redissolve all of the solids.

Stirring was continued for 15 minutes, after which 1100 ml of water was added to reprecipitate the solids. The flask was cooled to 20° C. in ice and vacuum filtered. The filter cake was washed with 1200 ml of water and dried in a vacuum oven at 75° C., yielding 335.44 g (98.1% crude yield) of a white solid. Recrystallization from methanol followed by vacuum drying yielded 244.14 g (71.4% of theoretical) of purified product in the form of colorless crystals with a melting point of 208°–210° C. The purified product was shown by elemental analysis, atomic adsorption analysis and proton nuclear magnetic resonance spectroscopy to be the desired hexaethylguanidinium bisphenolate, having the stoichiometric proportions of three hydrogen atoms, one hexaethylguanidinium cation moiety and two bisphenol A dianion moieties.

EXAMPLE 2

A 2-l jacketed reactor was charged with 228.29 g (1 mole) of bisphenol A and catalyst solution equivalent to 0.5 mole of hexaethylguanidinium chloride. The solution was mechanically stirred and heated to 90° C., whereupon two liquid phases formed. Sodium hydroxide, 0.5 mole as an approximately 15% aqueous solution, was added dropwise, whereupon a white precipitate formed. Water, 500 ml, was added and stirring was continued for about 15 minutes. Upon workup as in Example 1, the desired hexaethylguanidinium bisphenolate was obtained in 98.3% crude and 69.2% pure yield.

EXAMPLE 3

A 500-ml, 3-necked round-bottomed flask was charged with 22.8 g (100 mmol) of bisphenol A and 250 ml of toluene. The flask was fitted with a Dean-Stark trap and an addition funnel and the resulting solution therein was heated to reflux, with stirring. The addition funnel was charged with catalyst solution equivalent to 50 mmol hexaethylguanidinium chloride and with 50% aqueous sodium hydroxide solution containing 4.00 g (50 mmol) of sodium hydroxide, and this combination was added dropwise to the refluxing bisphenol A solution. The funnel was washed with 100 ml of water which was then added to the flask, after which the water was removed by azeotropic distillation causing precipitation of a white solid. The contents of the flask were filtered and the filter cake was washed with 600 ml of water and dried in a vacuum oven. The crude yield of the desired hexaethylguanidinium bisphenolate was 33.1 g, or 96.7% of theoretical.

EXAMPLE 4

The procedure of Example 1 was repeated, substituting bis(4-hydroxyphenyl) sulfide on an equimolar basis for the bisphenol A. A similar product, melting at 158°–160° C., was obtained.

EXAMPLE 5

The procedure of Example 1 was repeated, substituting 1,1-dichloro-2,2-bis(4-hydroxyphenyl)ethylene on an equimolar basis for the bisphenol A. A similar product, melting at 178°–180° C., was obtained.

EXAMPLE 6

The procedure of Example 1 was repeated, substituting hexa-n-propylguanidinium chloride on an equimolar basis for the hexaethylguanidinium chloride. A similar product, melting at 209°–211° C., was obtained.

EXAMPLE 7

The procedure of Example 1 was repeated, substituting tetraethylammonium chloride on an equimolar basis for the hexaethylguanidinium chloride. A similar product, melting at 188°–190° C., was obtained.

EXAMPLE 8

The procedure of Example 1 was repeated, substituting tetra-n-butylammonium chloride on an equimolar basis for the hexaethylguanidinium chloride. A similar product, melting at 217°–219° C., was obtained.

EXAMPLE 9

The procedure of Example 1 was repeated, substituting tetra-n-butylphosphonium chloride on an equimolar basis for the hexaethylguanidinium chloride. A similar product, melting at 219°–221° C., was obtained.

EXAMPLE 10

A 10-ml vial was charged with 440.5 mg (4 mmol) of hydroquinone, 160 mg (2 mmol) of a 50% aqueous sodium hydroxide solution and 3 ml of methanol. The vial was agitated until a homogeneous solution was obtained. Catalyst solution containing 27.85% hexaethylguanidinium chloride, in the amount of 2 mmol of the guanidinium salt, and 2 ml of methanol were added, with stirring. A precipitate of the desired hexaethylguanidinium hydroquinone salt, as shown by proton nuclear magnetic resonance spectroscopy, formed immediately and was collected by filtration; the yield was 70% of theoretical.

EXAMPLE 11

A 10-ml vial was charged with 440.5 mg (4 mmol) of resorcinol, 160 mg (2 mmol) of a 50% aqueous sodium hydroxide solution and 3 ml of methanol. The vial was agitated until a homogeneous solution was obtained. Catalyst solution containing 27.85% hexaethylguanidinium chloride, in the amount of 2 mmol of the guanidinium salt, and 2 ml of methanol were added, with stirring. The resulting solution was cooled in an ice-water bath, whereupon a fine flocculent precipitate of the desired hexaethylguanidinium resorcinol salt, as shown by proton nuclear magnetic resonance spectroscopy, gradually formed; it was collected by filtration. The yield was 40% of theoretical.

EXAMPLE 12

A 416-1 continuous stirred tank reactor was charged with 62.89 kg (275.47 moles) of bisphenol A and 70.00 kg of anhydrous methanol. The resulting solution was heated to reflux and 11.15 kg (139.385 moles) of 50% aqueous sodium hydroxide solution was added over 0.5 hour. To the resulting whitish slurry was added catalyst solution containing 27.85% hexaethylguanidinium chloride, in the amount of 40.711 kg of the guanidinium salt. After approximately 10–20% of the catalyst solution had been added, a noticeable fine white precipitate had formed. After the addition was complete, an additional 85.90 kg of water was added.

The reaction mixture was allowed to cool from 65° C. to approximately 18°–20° C., during which time the guanidinium bisphenolate precipitated as fine cubic crystals. The crude precipitate was collected by filter-centrifugation and rinsed with 50 liters of water. After extended centrifugation, the crude yield of material was 105.5 kg. The product was dried in a vacuum tumble dryer to yield 94.06 kg was obtained (99.84% of theoretical). Analysis by ion chromatography and proton nuclear magnetic resonance spectroscopy showed the product to be 99+% pure, containing 242 ppm residual sodium ion as sodium chloride.

The product was further purified by recrystallization from methanol-water. A 416-1 continuous stirred tank reactor was charged with 40 kg of the product and the 252.84 1 of methanol, and the solution was brought to reflux. Additional water (133.40 kg) was added. After about 10–15% of this water had been added, a whitish precipitate formed. The hot solution was allowed to cool to 15°–18° C. and the product was collected by filter-centrifugation. The crystalline material was rinsed with 40 l of water. The recrystallization yielded 33.60 kg of the purified hexaethylguanidinium bisphenolate. This material was dried under vacuum in a tumble dryer for 48 hours. The final dry yield was 32.17 kg (95.14% of theoretical). Proton nuclear magnetic resonance spectroscopy, capillary electrophoresis and ion chromatography showed the product to be 99.9+% pure with a residual sodium ion content (as sodium chloride) of 0.50 ppm.

. The quaternary bisphenolates of the present invention may be used in various aspects of polymer synthesis. For example, as previously suggested they are useful as intermediates for conversion by alkaline hydrolysis to phase transfer catalysts useful in two separate overall processes for polyetherimide production. The first is the reaction, in a substantially non-polar solvent, of an alkali metal salt of a dihydroxyaromatic compound with a halo- or nitro-substituted N-alkylphthalimide to produce a bisimide, which may be converted to a dianhydride which can in turn undergo reaction with a diamine to form the polyetherimide. The second is the reaction under similar conditions of said alkali metal salt with a chloro- or nitro-substituted bis(etherphthalimide), which directly affords the polyetherimide. Typical catalyst proportions in this reaction are in the range of about 0.5–10.0 milliequivalents per equivalent of substituted phthalimide.

Alkaline hydrolysis of the quaternary bisphenolate to the polyetherimide catalyst species may be achieved by combining it with excess alkali metal hydroxide, typically a 15–25% excess over the theoretical molar ratio of base to bisphenolate of 3:1, followed by removal of water which is conveniently done azeotropically by adding the aqueous phase gradually to refluxing toluene. The hydrolysis product may then be removed by filtration and/or distillation.

The quaternary bisphenolates may also serve as intermediates in various stages of purification and recycle of materials in polyetherimide preparation. For example, suitable treatment of waste streams from the displacement reaction of an alkali metal salt of bisphenol A with a halo- or nitro-substituted phthalimide, using a hexaalkylguanidinium halide as catalyst, can afford the corresponding quaternary bisphenolate which, upon acidification, yields a hexaalkylguanidinium halide or the like and the free bisphenol, both of which may be recycled. The quaternary bisphenolate may also serve as an intermediate in purification of the corresponding bisphenol.

Other uses for the quaternary bisphenolates are as catalysts in any reaction in which a phenoxide moiety serves as a catalytic agent. An exemplary reaction of this type is the preparation of branched polycarbonates by equilibration. Said reaction is disclosed, for example, in U.S. Pat. No. 5,021,521, the disclosure of which is incorporated by reference herein.

The quaternary bisphenolates of this invention have been found to be excellent equilibration catalysts. The equilibration reaction takes-place when an intimate mixture of a linear or branched polycarbonate, a polyphenolic compound and a carbonate equilibration catalyst is heated in the melt, as in a batch melt reactor or an extruder, at temperatures in the range of about 250°–350° C. for approximately 5–30 minutes.

The proportions of catalyst and branching agent are ordinarily about 10–500 ppm by weight and about 0.1–2.0 mole percent based on structural units in the polycarbonate, respectively. The quaternary bisphenolate decomposes during the reaction to an olefin, a bisphenol and the relatively volatile pentaalkylguanidine, resulting in the production of a branched polycarbonate of high stability and low color. Various aspects of this method of preparing branched polycarbonates are disclosed and claimed in provisional application Ser. No. 60/21,749 and copending, commonly owned application Ser. No. 08/768,870.

The quaternary bisphenolates are also active as catalysts in melt polycarbonate formation by the reaction of a dihydroxyaromatic compound, usually a bisphenol such as bisphenol A, with a diaryl carbonate such as diphenyl carbonate. They may be used alone or in combination with other suitable catalysts such as tetraalkylammonium hydroxides. Typical proportions of the quaternary bisphenolate for this purpose, and also for any other catalyst additionally employed, are from about 0.2 mole ppm to about 0.1 mole percent. The melt polycarbonate thus produced is frequently found to have reduced levels of color bodies and branched and/or crosslinked polymer in comparison to polycarbonates obtained with the use of alkali or alkaline earth metal bases as catalysts.

The use of the quaternary bisphenolates as catalysts and catalyst intermediates is illustrated by the following examples.

EXAMPLE 13

A 50-ml round-bottomed flask equipped with a reflux condenser, magnetic stir bar and nitrogen purge means was charged with 7.36 g (10.7 mmol) of the product of Example 1, 15 ml of water and 3.01 g of 50% aqueous sodium hydroxide solution (37.5 mmol of sodium hydroxide). The mixture was stirred under nitrogen at 100° C. to effect solution, and was then transferred to a heated constant addition funnel and diluted with 15 ml of water. It was dripped into 200 ml of refluxing toluene in a 250-ml round-bottomed flask equipped with a stir bar, Dean-Stark trap topped with a reflux condenser and nitrogen purge means. All of the water was removed by distillation over approximately 20 minutes, after which 100 ml of toluene was removed by distillation to yield a slurry of a white precipitate in toluene, which was dried by vacuum stripping and heating at 150° C. under reduced pressure.

A 250-ml, 2-necked round-bottomed flask fitted with a reflux condenser, a magnetic stir bar, a Dean-Stark trap and nitrogen purge means was charged with 7.54 g (27.7 mmol) of anhydrous bisphenol A disodium salt and 85 ml of anhydrous toluene. The mixture was stirred and heated to remove 34 ml of toluene and any remaining moisture by azeotropic distillation. A capped tube was charged with 11.42 g (55 mmol) of dried 4-nitro-N-methylphthalimide and 410 mg of the above-prepared white solid (0.53 mmol of active catalyst) and the contents thereof were transferred to the toluene slurry. The mixture was heated under nitrogen at 145° C., with stirring, for 90 minutes and was then cooled to 80° C. Upon sampling and analysis, it was determined that the desired 2,2-bis[4-(3,4-dicarboxyphenoxy)phenyl] propane bis-N-methylimide had been formed in 98.1% yield.

EXAMPLE 14

A dry blend was prepared from a commercial bisphenol A polycarbonate having a weight average molecular weight of about 66,000 relative to polystyrene as determined by gel permeation chromatography, the product of Example 1 as an equilibration catalyst in the amount of 129 ppm by weight and [1,1-bis(p-hydroxyphenyl)ethyl]phenyl ether as a branching agent, the latter compound having been prepared by Friedel-Crafts acylation of phenyl ether with acetic anhydride followed by reaction with 4 moles of phenol in the presence of boron trifluoride-ethyl ether complex and 3-mercaptopropionic acid. The blend was extruded on a twin screw extruder at a temperature of about 280° C., with vacuum venting. The product was the desired branched polycarbonate.

EXAMPLES 15–19

In these examples, a 1-l glass melt polymerization reactor was washed with acid, rinsed and dried at 70° C. overnight to passivate the surfaces thereof. It was charged with 137 g (600 mmol) of bisphenol A, 135 g (630 mmol) of diphenyl carbonate and various catalytic amounts of the product of Example 1. A helixing stirrer was suspended in the powdered mixture and the reactor was evacuated three times to 1 torr, followed each time by refilling with purified nitrogen.

The reactor was heated to 180° C., whereupon the mixture melted. It was thermally equilibrated, with stirring, for 5–10 minutes. In Examples 15–18, a catalytic amount of tetramethylammonium hydroxide was added at this point. Stirring at 180° C. was continued for an additional 5 minutes, after which the temperature was raised to 210° C. and the pressure lowered to 175 torr, whereupon phenol began to distill from the reactor.

After 35 minutes, the reactor pressure was lowered to 100 torr and stirring was continued for 35 minutes. The temperature was then raised to 240° C. and the pressure reduced to 15 torr for 40 minutes, to 270° C. and 2 torr for 20 minutes, and to 300° C. and 0.62 torr for 75 minutes.

The products were the desired polycarbonates. Catalyst details and properties of the products are listed in the following table. Molecular weights were determined by gel permeation chromatography relative to polystyrene; catalyst amounts are based on bisphenol A.

| Example | Catalyst | Mw | Mn |
| --- | --- | --- | --- |
| 15 | Example 1, 250 mole ppm TMAH, 83.3 mole ppm | 33,700 | 12,300 |
| 16 | Example 1, 42 mole ppm TMAH, 83.3 mole ppm | 55,800 | 20,300 |
| 17 | Example 1, 0.42 mole ppm TMAH, 83.3 mole ppm | 33,500 | 12,400 |
| 18 | Example 1, 4.2 mole ppm TMAH, 83.3 mole ppm | 81,700 | 27,300 |
| 19 | Example 1, 0.42 mole ppm | 43,200 | 19,400 |

What is claimed is:

1. A quaternary salt of a dihydroxyaromatic compound, said salt having the molecular formula $$H_3Q(OA^1O)_2, \qquad (I)$$

wherein $A^1$ is a divalent aromatic radical and Q is a monocationic carbon- and nitrogen- or phosphorus-containing moiety.

2. A salt according to claim 1 which is a quaternary bisphenolate wherein $A^1$ is $$-A^2-Y-A^2-, \qquad (II)$$

wherein $A^2$ is unsubstituted p-phenylene and Y is a single bond or a bridging radical wherein 1–2 atoms separate the $A^2$ values.

3. A bisphenolate according to claim 2 having the molecular structure of a double helix of $(OA^2)_2Y$ moieties linked via hydrogen bonds, with the Q moieties lying outside the double helix.

4. A bisphenolate according to claim 2 wherein Q is tetra($C_{2-6}$)alkylammonium or hexa($C_{2-6}$)alkylguanidinium.

5. A bisphenolate according to claim 2 wherein Q is tetraethylammonium.

6. A bisphenolate according to claim 4 wherein Q is hexaethylguanidinium.

7. A bisphenolate according to claim 4 wherein Y is isopropylidene.

8. A bisphenolate according to claim 7 having molecular structure of a double helix of bisphenol A moieties linked via hydrogen bonds, with the hexaethylguanidinium cations lying outside the double helix.

9. A method for preparing a quaternary salt which comprises contacting a dihydroxyaromatic compound of the formula $(HO)_2A^1$ with an alkali metal hydroxide and a quaternary salt of the formula $Q^+X^-$, wherein $A^1$ is a divalent aromatic radical, Q is a monocationic carbon- and nitrogen-containing moiety containing 9–34 atoms and X is halide.

10. A method according to claim 9 wherein $A^1$ is $$-A^2-Y-A^2-, \qquad (II)$$

wherein $A^2$ is unsubstituted p-phenylene and Y is a single bond or a bridging radical wherein 1–2 atoms separate the $A^2$ values.

11. A method according to claim 10 wherein the alkali metal hydroxide is sodium hydroxide.

12. A method according to claim 10 wherein X is chloride.

13. A method according to claim 10 wherein Q is tetra($C_{2-6}$)alkylammonium or hexa($C_{2-6}$)alkylguanidinium.

14. A method according to claim 13 wherein Q is tetraethylammonium.

15. A method according to claim 13 wherein Q is hexaethylguanidinium.

16. A method according to claim 13 wherein Y is isopropylidene.

* * * * *